United States Patent
Clyne et al.

(10) Patent No.: US 6,764,772 B2
(45) Date of Patent: Jul. 20, 2004

(54) SANDWICH MATERIAL

(75) Inventors: Trevor William Clyne, Cambridge (GB); Athina Markaki, Cambridge (GB)

(73) Assignee: Cambridge University Technical Services Ltd., Cambridge (GB)

( * ) Notice: Subject to any disclaimer, the term of this patent is extended or adjusted under 35 U.S.C. 154(b) by 249 days.

(21) Appl. No.: 10/000,117

(22) Filed: Oct. 31, 2001

(65) Prior Publication Data

US 2003/0082335 A1 May 1, 2003

(51) Int. Cl.[7] .......................... B23B 28/00; B32B 5/08; B32B 15/14; B32B 31/06
(52) U.S. Cl. ....................... 428/567; 428/568; 428/608; 428/75; 428/86; 428/297.4; 228/57; 181/284
(58) Field of Search ................................. 428/567, 568, 428/608, 75, 86, 297.4; 228/57; 181/284

(56) References Cited

U.S. PATENT DOCUMENTS

| | | | | |
|---|---|---|---|---|
| 3,780,969 A | * | 12/1973 | Nussbaum et al. | 244/123 |
| 3,900,651 A | * | 8/1975 | Hoppe et al. | 428/86 |
| 5,102,723 A | * | 4/1992 | Pepin | 428/223 |
| 5,238,260 A | * | 8/1993 | Scherubl | 280/610 |
| 5,741,574 A | * | 4/1998 | Boyce et al. | 428/119 |
| 5,773,117 A | * | 6/1998 | Tognelli | 428/75 |

FOREIGN PATENT DOCUMENTS

WO   WO 98/01295   1/1998

OTHER PUBLICATIONS

"The Gordon Laboratory 2001,"Cambridge material *eyes*, Aug. 2001, Issue 11, Department of Materials Science and Metallurgy, Cambridge, United Kingdom.

Tom Shelley, "*Steel fibres fill lightweight sandwich*," European Automotive Design, Sep. 2001, p. 28.

Tom Shelley, "*Steel makes lightweight fibre sandwich*," Eureka, Sep. 2001, p. 26.

A.E. Markaki, R.G–N. Gustafsson & T. W. Clyne, "*Development of an Ultralight Stainless Steel Sheet Material,*" The Gordon Laboratory, Department of Materials Science and Metallurgy, University of Cambridge, United Kingdom, presented in Jun. 2001.

* cited by examiner

*Primary Examiner*—Deborah Jones
*Assistant Examiner*—Jason L Savage
(74) *Attorney, Agent, or Firm*—Alston & Bird LLP

(57) ABSTRACT

A sandwich material comprising two metal plates affixed to and separated by a fibrous core, is characterised in that the core comprises a three-dimensional porous network comprising metal fibres, wherein substantially all of the fibres are inclined at an acute angle to the plates. The sandwich material is lightweight, thin and handles like a monolithic sheet. It displays high beam stiffness and is easy to weld. It as therefore particularly useful in the manufacture of aircraft and vehicle parts.

19 Claims, No Drawings

SANDWICH MATERIAL

FIELD OF THE INVENTION

The present invention relates to a sandwich material, which is particularly useful in vehicle construction.

BACKGROUND TO THE INVENTION

It is well-recognised that sandwich structures, which are composed of stiff outer layers separated by a low density core, offer the potential for very high specific stiffness and other attractive mechanical properties. Such materials are generally rigid and strong, but are of relatively low mass. They are therefore particularly useful as construction materials or packaging materials, for example.

WO-A-9801295 discloses a sandwich material comprising metal plates separated by metal fibres arranged perpendicularly to the plates, and which are affixed thereto by an adhesive. The sandwich material is made by coating at least one of the metal plates with an adhesive, and then subjecting short metal fibres to an electrical charge. This causes the fibres to stand upright and propels them into the adhesive on one of the metal plates, where they become anchored. This process is commonly known as "flocking".

A disadvantage of this type of sandwich material is, however, its rather complex, and therefore costly, method of manufacture. Furthermore, due to its relatively high electrical resistance, this type of sandwich material is not easy to weld. Ease of weldability is of course an essential property of materials for use in construction.

Therefore, there is a need for a sandwich material which is not only straightforward and therefore relatively cheap to manufacture, but which also has a relatively low electrical resistance and is therefore easy to weld.

SUMMARY OF THE INVENTION

According to a first aspect of the present invention, a sandwich material comprises two metal plates which are affixed to and separated by a fibrous core, and is characterised in that the core comprises a three-dimensional porous network comprising metal fibres, wherein substantially all of the fibres are inclined at an acute angle ($\theta$) to the plates.

The sandwich material may be prepared by simply affixing the fibrous core between two metal plates, for instance though the use of an adhesive or by brazing technology.

The sandwich material according to the present invention is more straightforward and therefore cheaper to manufacture than the materials known in the art. In addition, the sandwich material has a comparatively lower electrical resistance (because of the good contact between fibres and face-plates), rendering it easily weldable. It also exhibits improved beam stiffness and interfacial shear strength, at relatively low areal density, in comparison with the prior art materials. Such properties are particularly desirable for materials to be used in construction, for instance of vehicles including aircraft. The sandwich material according to the present invention may also display high acoustic and vibrational damping capacity, and efficient thermal insulation.

According to further aspects of the present invention, sandwich materials of the type described above may be used as vehicle parts, or in a variety of welded structures or components.

DESCRIPTION OF THE INVENTION

In order for the sandwich material according to the present invention to be suitable for use in aircraft or vehicle construction, it should be lightweight and relatively thin. Suitable total thicknesses of the sandwich material are of the order 0.5 mm–1 cm, preferably 0.5–5 mm and more preferably 0.5–3 mm.

The metal plates may be made from a variety of different metals, examples of which include stainless steel, steel, aluminium and titanium. Preferably, however, the metal plates will be made from stainless steel or aluminium.

The thicknesses of the metal plates should be such that they are not susceptible to tearing. Suitable thicknesses of the metal places lie in the range 100–600 $\mu$m, and more preferably in the range 150–300 $\mu$m.

The core of the sandwich material comprises a three-dimensional porous network of fibres which are preferably bonded together at crossover points within the network, for instance by the action of heat. The fibres may be arranged in a regular mesh, or be randomly arranged throughout the network. Preferably, the fibres are randomly orientated so that the core properties are isotropic.

The fibres are arranged within the core so that they form an angle to the plane of the core, and therefore the metal plates. The fibres may be arranged in regular arrays, in which case the angle formed by each fibre will be similar to the next, or randomly orientated to form different angles to the plane of the core. Substantially all of the fibres are inclined at an acute angle ($\theta$) to the plane of the core, and in the context of this Application by "substantially all" we mean at least 80%, and preferably at least 90% by volume of the fibres. The angle, or angles, at which the fibres are inclined to the metal plates is preferably substantially less than 90°, for instance less than 60°, and more preferably lies in the range 10–55°. Most preferably the angle lies in the range 20–50°, with the interlaminar shear stiffness and shear strength being optimised when the fibre angle approaches 45°.

The core has a relatively open structure, with the fibres in the core generally occupying 5–50%, and preferably 5–10%, of the core volume. The sizes of the pores within the network typically lie in the range 50–200 $\mu$m, and are preferably 75–125 $\mu$m, eg. about 100 $\mu$m.

The thickness of the core typically lies in the range 300–3000 $\mu$m, and preferably in the range 500–2000 $\mu$m.

The metal fibres may comprise a variety of different metals, examples of which include stainless steel, steel, aluminium and titanium. Preferably, the core will comprises stainless steel or aluminium fibres. In addition, the metal fibres may be made from the same or different metal as the plates, but are preferably the same metal.

Typically, the fibres will have lengths of less than 5000 $\mu$m, and preferably 100–3000 $\mu$m. The average diameter of fibres suitable for use in the present invention is typically less than 500 $\mu$m, for example 10–400 $\mu$m. Preferably, the average fibre diameter will lie in the range 60–350 $\mu$m, and will more preferably be in the range 100–300 $\mu$m. In the context of this Application, by "average diameter" we mean the mean fibre diameter as calculated from the sum of the individual diameters of a plurality of fibres divided by the number of fibres.

As a generality the sandwich material should be stiff but flexible, but need only be stiff enough to maintain the separation of the plates and to prevent excessive shearing between the plates when they are subjected to a bending moment, for example during manufacture or use. A minimum in-plane shear modulus of about 1 GPa would be sufficient to achieve suitable rigidity of the core.

The stiffness of the core is dependent on a number of factors including the fibre diameter, the fibre volume fraction and the degree of bonding of the fibres within the network. In general, the coarser the fibres, the greater the stiffness of the core. However, the use of fibres with very large diameters may lead to difficulties in the manufacture, handling and subsequent incorporation of the core into the sandwich materials.

A suitable, commercially available core is manufactured by Bekaert, a Belgian company, under the trade name BEKIPOR®.

One way in which the core may be prepared is by forming a slurry of the fibres in a liquid, eg. water, allowing the fibres to settle, and then removing the liquid from the resulting accumulated fibres by pressing and/or heating, for example. The resulting product may then be subjected to heat and optionally pressure, under slightly reducing conditions in order to avoid oxidation, to bond the fibres together.

The core may also comprise non-metallic fibres. The choice of non-metallic fibres suitable for use is likely to depend on the intended application of the sandwich material. For example, if the sandwich material is to be used in vehicle or aircraft construction, the non-metallic fibres should be able to withstand relatively high temperatures. It is therefore envisaged that ceramic or polymeric fibres may be applicable to the present invention.

The core may additionally comprise a polymeric matrix, for example an epoxy resin, which may be beneficial in terms of enhancing the damping capacity of the sandwich material. The amount of polymer in the core may, however, be limited by the fact that it is important to retain a good electrical contact between the metal plates and the metal fibres in the core. Suitable amounts of polymer lie in the range 10–200% of the volume of the metal fibres.

The metal plates and core may be joined together in a variety of ways, however, it is important that the method chosen is such that the through-thickness electrical resistance of the sandwich material is kept relatively low. Ideally, the electrical resistivity of the core should be no greater than about 0.01–1 $\Omega$cm, so that resistance (spot) welding may be readily carried out using conventional equipment.

A preferred method of affixing the metal plates to the core is by means of a braze. The choice of braze will depend on the metal from which the plates and the fibres are made. The braze may be applied either to the plates or to the core by any suitable method, for example coating, spraying or dipping. The average pore sizes of the core should be selected so as to retain the braze on the surface of the core and not to allow it to penetrate the core to any significant extent.

A drawback of using a braze to affix the plates to the core is, however, that most brazes are relatively dense and therefore increase the overall areal density of the sandwich material. Therefore, an alternative way in which the plates may be affixed to the core is by means of an adhesive. Again, the adhesive may be applied to the plates or the core by coatings spraying or dipping, for example. Suitable adhesives include epoxy resins. The presence of adhesive within the core may improve the acoustic absorption and vibration damping characteristics of the sandwich material. In addition, the use of an adhesive may make the overall cost of production of the sandwich material cheaper than if a braze was used to affix the plates to the core.

When using adhesive to affix the metal plates to the core, it is important to retain good electrical contact between the plates and the core. This will be dependent on a number of factors including the amount of adhesive applied to the plates and, in particular, the stiffness of the fibres in the core. Specifically, the fibres should be stiff and strong enough such that when pressure is applied to affix the plates to the core, the fibres will come into contact with the plates and will not bend away from the plates.

It is envisaged that the sandwich material according to the present invention will find use in a wide variety of applications. The fact that the sandwich material handles like a monolithic sheet means that it may be readily molded, shaped or deep drawn to form a wide variety of components. Its high beam stiffness, coupled with its light mass and suitability for welding, render it particularly useful in the manufacture of aircraft or vehicle parts, for example spoilers, panels and roofs for both non-convertible and hard-cop convertible cars.

The present invention is now further illustrated by way of the following Example.

EXAMPLE

Preparation of Sandwich Material

Two stainless steel plates of length 80 mm, width 20 mm and thickness 200 $\mu$m, were coated with a chromium/nickel braze and were then positioned either side of a fibrous stainless steel core of the same length and width and having a thickness of 800 $\mu$m, supplied by Bekaert under the product name BEKIPOR® NPF 90071-000. The resulting sandwich construction was clamped and heated to about 1000° C. in order to bond the metal plates to the core. The areal density of the resulting product was 5.0 kg/m$^2$, and the core fibre volume fraction was 0.19.

Various physical properties of the resulting sandwich material were subsequently determined, and compared with those of a sandwich material of the type described in WO-A-9801295. This material was prepared by coating one side of a stainless steel plate of length 80 mm, width 20 mm and thickness 200 $\mu$m, with a 200 g/m$^2$ layer of Gurit Essex Betamate (1185) adhesive, and subsequently flocking stainless steel fibres of average length 1 mm and diameter 25 $\mu$m on to the coated steel plate to produce a fibre layer of approximate thickness of 0.8 mm. The adhesive was allowed to harden, and a second stainless steel plate of the same dimensions as the first was coated with adhesive in the same way as the first, and brought into contact with the fibres. The resulting structure was then clamped, to give a final sandwich having a thickness of 1.2 mm, an areal density of 3.8 kg/m$^2$ and a core fibre volume fraction of 0.08.

Beam Stiffness

The beam stiffness per unit width of each of the sandwich materials was determined by cantilever bending, with a scanning laser extensometer to measure accurately the vertical displacement and using small weights to apply the load. Applied forces were of the order of a few tens of milliNewtons and displacements were of the order of a few hundred micrometers. Elastic behaviour was confirmed by carrying out measurements during progressive increases, followed by decreases, in the applied load.

The beam stiffness per unit width of the sandwich material according to the present invention was about 30 N m, whereas that of the material described in WO-A-9801295 was 12 N m.

Through-Thickness Electrical Resistivity

The through-thickness electrical resistivity of each sandwich material was determined by measurement of the voltage drop between the face-plates with a 1 A current, using an AC modulation technique to eliminate other voltage drops in the sensing circuit.

The through thickness resistivity, which is dependent on the fibre volume fraction of the core, was found to be approximately 0.01 $\Omega$cm for the sandwich material according to the present invention, whereas the resistivity of the sandwich material described on WO-A-9801295 was found to be approximately 10 Ωcm.

What is claimed is:

1. A sandwich material comprising two metal plates which are affixed to and separated by a fibrous core, the core comprising a three-dimensional porous network comprising metal fibres, wherein substantially all of the fibres are inclined at an acute angle (θ) to the plates.
2. A sandwich material according to claim 1, wherein the metal fibres are bonded together at crossover points within the network.
3. A sandwich material according to claim 1, wherein the metal plates and the metal fibres comprise metals selected from the group consisting of stainless steel, steel, aluminium and titanium.
4. A sandwich material according to claim 3, wherein the metal plates and the metal fibres comprise stainless steel or aluminium.
5. A sandwich material according to claim 1, wherein the plates are affixed to the fibrous core by means of a braze.
6. A sandwich material according to claim 1, wherein the plates are affixed to the fibrous core by means of an adhesive.
7. A sandwich material according to claim 1, wherein the fibres in the core are randomly oriented.
8. A sandwich material according to claim 1, wherein θ is less than 60°.
9. A sandwich material according to claim 1, wherein the average diameter of the fibres is less than 500 μm.
10. A sandwich material according to claim 1, wherein the total thickness of the material is 0.5 mm–1 cm.
11. A sandwich material according to claim 1, wherein the fibres occupy 5–50 volume % of the core.
12. A sandwich material according to claim 11, wherein the fibres occupy 5–10 volume % of the core.
13. A sandwich material according to claim 1, wherein the core additionally comprises non-metallic fibres.
14. A sandwich material according to claim 1, wherein the fibrous core additionally comprises a polymer matrix.
15. A process for the preparation of a sandwich material as defined in claim 1, comprising the step of affixing two metal plates to either side of a fibrous core.
16. A welded material comprising a sandwich material as defined in claim 1 welded to a substrate.
17. A vehicle part comprising a sandwich material as defined in claim 1.
18. A vehicle part according to claim 17, which is selected from the group consisting of spoilers, panels and roofs.
19. A vehicle comprising a vehicle part as defined in claim 17.

* * * * *